US007451690B2

(12) United States Patent
Schrader et al.

(10) Patent No.: US 7,451,690 B2
(45) Date of Patent: Nov. 18, 2008

(54) SPRING-ACTUATED AIR-BRAKE CYLINDER FOR VEHICLE BRAKE SYSTEMS

(75) Inventors: Frank Schrader, Burgwedel (DE); Oliver Brandt, Braunschweig (DE); Jürgen Ewald, Laatzen (DE); Wilfried Matthias, Bad Nenndorf (DE); Andreas Richter, Wedemark (DE)

(73) Assignee: WABCO GmbH, Hannover (DE)

( * ) Notice: Subject to any disclaimer, the term of this patent is extended or adjusted under 35 U.S.C. 154(b) by 182 days.

(21) Appl. No.: 11/489,706

(22) Filed: Jul. 18, 2006

(65) Prior Publication Data
US 2007/0028761 A1 Feb. 8, 2007

(30) Foreign Application Priority Data
Jul. 20, 2005 (DE) .................. 10 2005 033 820

(51) Int. Cl.
*F16D 65/32* (2006.01)
*B60T 17/00* (2006.01)
(52) U.S. Cl. ............................ 92/63; 92/64
(58) Field of Classification Search ............ 92/62, 92/63, 64
See application file for complete search history.

(56) References Cited

U.S. PATENT DOCUMENTS

| 3,101,219 A | 8/1963 | Herrera |
| 3,208,721 A | 9/1965 | McHugh |
| 3,826,176 A * | 7/1974 | Ike .......................... 92/63 |
| 3,926,094 A * | 12/1975 | Kurichh et al. ............. 92/63 |
| 4,860,640 A | 8/1989 | Ware |
| 5,067,391 A | 11/1991 | Choinski et al. |
| 5,105,727 A | 4/1992 | Bowyer |
| 5,507,217 A | 4/1996 | Plantan |
| 5,588,348 A | 12/1996 | Plantan et al. |
| 5,634,391 A | 6/1997 | Eady |
| 5,771,774 A | 6/1998 | Stojic |
| 5,799,564 A | 9/1998 | Pierce |
| 6,055,898 A | 5/2000 | Rinninger |
| 6,145,430 A | 11/2000 | Able et al. |
| 6,164,187 A | 12/2000 | Stojic |
| 6,230,609 B1 | 5/2001 | Bender et al. |
| 6,238,132 B1 | 5/2001 | Plantan et al. |
| 6,314,861 B1 | 11/2001 | Smith et al. |

(Continued)

FOREIGN PATENT DOCUMENTS

| DE | 2 088 525 A | 6/1982 |
| DE | 3026596 A1 | 11/1982 |
| DE | 3404014 A1 | 8/1985 |

*Primary Examiner*—Thomas E Lazo
(74) *Attorney, Agent, or Firm*—Kramer Levin Naftalis & Frankel LLP

(57) ABSTRACT

A spring-actuated air-brake cylinder as the diaphragm cylinder for vehicle brake systems includes a diaphragm, an actuator-spring chamber in which there is received a spring-actuated piston, which is acted on by a compression spring as the actuator spring and is actively connected to the diaphragm, which is disposed between the actuator-spring chamber and a pressure chamber, in which there is guided moveably a sealed push rod, which can include a pressure member on its diaphragm side. The spring-actuated diaphragm is connected to the push rod or to the pressure member or to the spring-actuated piston by means of vulcanization.

14 Claims, 5 Drawing Sheets

U.S. PATENT DOCUMENTS

| | | |
|---|---|---|
| 6,349,629 B1 | 2/2002 | Plantan et al. |
| 6,722,262 B2 | 4/2004 | Ball et al. |
| 6,883,417 B2 | 4/2005 | Headley et al. |
| 7,255,036 B2 | 8/2007 | Sacristan et al. |
| 7,343,847 B2 | 3/2008 | Scheckelhoff et al. |
| 2007/0240564 A1 | 10/2007 | Uehara et al. |

* cited by examiner

SPRING-ACTUATED AIR-BRAKE CYLINDER FOR VEHICLE BRAKE SYSTEMS

BACKGROUND OF THE INVENTION

The present invention relates generally to a spring-actuated air-brake cylinder as the diaphragm cylinder for vehicle brake systems.

U.S. Pat. No. 5,067,391 describes a spring-actuated air-brake cylinder with diaphragm cylinder wherein there is provided, in the pressure chamber of the spring actuator, a restoring spring that acts on a pressure plate connected by threaded means to a push rod and that presses the diaphragm against a piston plate. Considerable time and effort is needed to assemble this construction, and the spring of the spring actuator must be of relatively heavy design due to the opposing force of the restoring spring.

U.S. Pat. No. 5,507,217 describes a spring-actuated air-brake system with diaphragm cylinder wherein the diaphragm is provided with a central aperture via which the diaphragm can be connected securely to a push rod by means of perforated disks which can be disposed on both sides of the aperture and of a threaded stud which is passed through the perforated disks and screwed into the push rod, so that there is no need for a restoring spring. Relatively large clamping forces are necessary to ensure that the diaphragm is connected in sealed manner to the push rod, and considerable time and effort is required to put the assembly together.

Both of these solutions regarding diaphragm alignment and return have proven less than completely satisfactory. Accordingly, it is desired to provide a new spring-actuated air-brake cylinder as the diaphragm cylinder for vehicle brake systems which overcomes the disadvantages associated with conventional spring-actuated air-brake cylinders with diaphragm cylinders.

SUMMARY OF THE INVENTION

Generally speaking, it is an object of the present invention to provide a new spring-actuated air-brake cylinder as the diaphragm cylinder for a vehicle brake system characterized by a simplified construction and reduced time and effort for assembly.

In accordance with embodiments of the present invention, as described in greater detail hereinafter, depending on the construction of the spring-actuated cylinder, the push rod, the pressure member or the spring-actuated piston are connected to the diaphragm by means of a vulcanization process. This achieves a simple, cost-saving and secure connection between the diaphragm, on the one hand, and the pressure member or push rod or spring-actuated piston, on the other hand, so that there is no need for a restoring spring. It will be appreciated that the inventive construction reduces the time and effort of assembly, since the diaphragm forms, together with the pressure member and the push rod or together with the spring-actuated piston, a structural unit that can be pre-fabricated, the diaphragm preferably being formed as an annular diaphragm for connection to the spring-actuated piston.

The connection between diaphragm and pressure member can be improved by disposing the pressure member partly in the diaphragm or by vulcanizing the pressure member partly into the diaphragm. Also, the periphery of the pressure member (the pressure member can be a pressure plate) can be embedded at least partly in the diaphragm. Alternatively, the pressure member can be disposed in a shallow well defined by a bulge of the diaphragm.

The constructions of embodiments of the present invention can be used in compressed-air diaphragm cylinders of spring-actuated brake cylinders and combined service-brake and spring-actuated brake cylinders in motor vehicles.

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the present invention, reference is had to the following description taken in connection with the accompanying drawings in which.

DETAILED DESCRIPTION OF THE PREFERRED EMBODIMENTS

Figure 1:
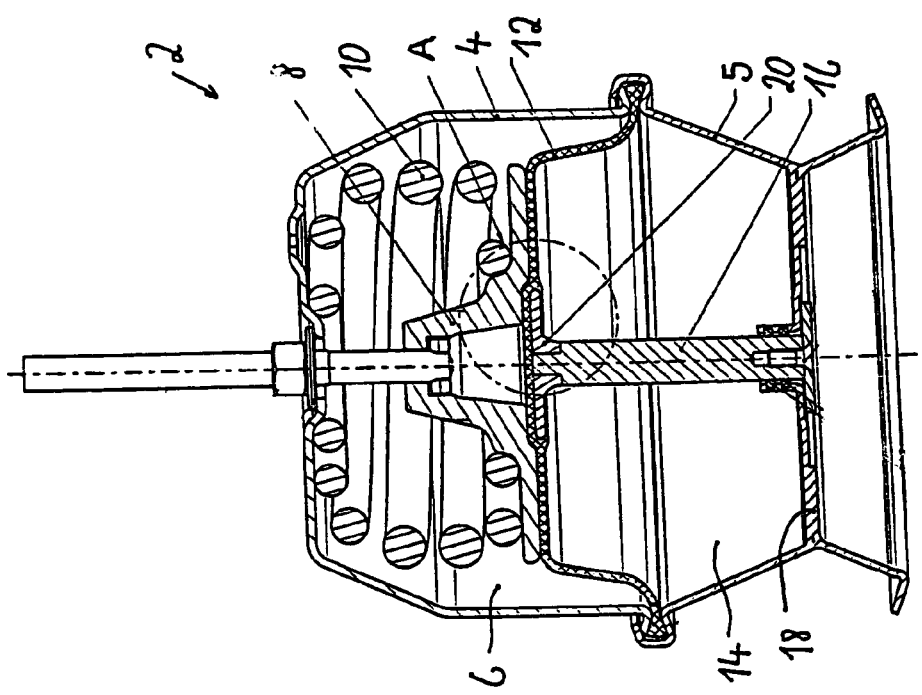
FIG. 1 is a cross-sectional view of a spring-actuated air-brake cylinder according to one embodiment of the present invention.

Referring to the drawing figures, where like reference numerals are used for corresponding parts, FIG. 1 depicts an embodiment of a spring-actuated air-brake cylinder 2 for a motor vehicle having a first housing part 4 and a second housing part 5. An actuator-spring chamber 6 formed in first housing part 4 receives a spring-actuated piston 8 which is acted on by a compression spring 10 as the actuator spring.

Spring-actuated piston 8 is actively connected to a diaphragm 12. Diaphragm 12 separates actuator-spring chamber 6 from a pressure chamber 14 which is formed in second housing part 5. Diaphragm 12 is circumferentially held (e.g., clamped) sealingly between the two housing parts 4 and 5.

Figure 3:
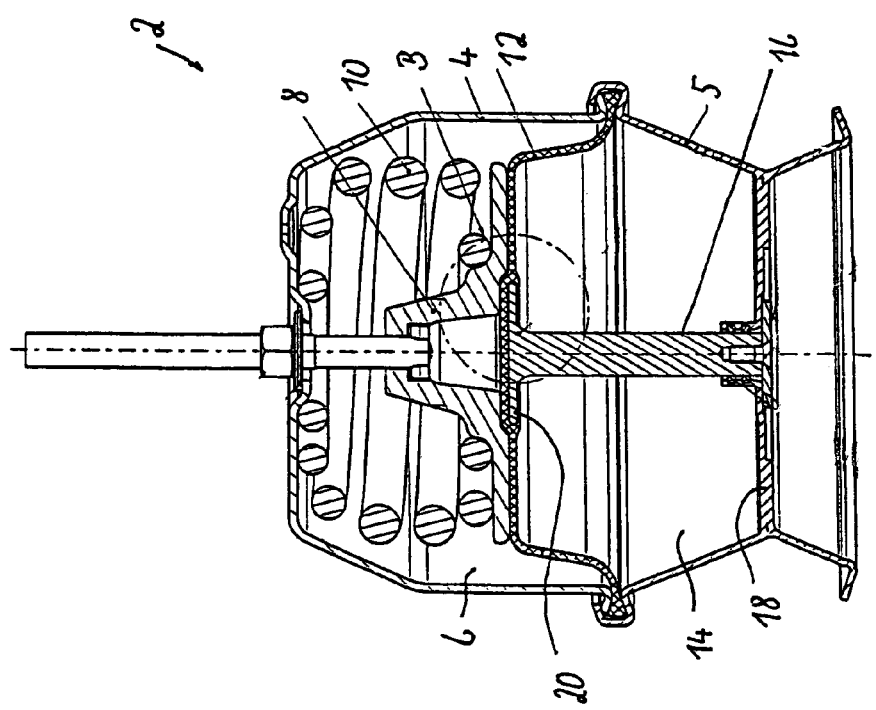
FIG. 3 is a cross-sectional view of a spring-actuated air-brake cylinder according to an alternative embodiment of the present invention.

Inside second housing part 5, a sealed push rod 16 is guided moveably in bottom 18 of housing part 5. On its diaphragm side, push rod 16 is provided with a plate-like pressure member 20 which is fastened (e.g., screwed) onto push rod 16 (see FIG. 1) or is formed in one piece with push rod 16 (see FIG. 3), and which is securely connected to diaphragm 12 by a vulcanization process. Via its periphery, pressure member 20 is preferably embedded in or vulcanized into diaphragm 12.

Figure 2:
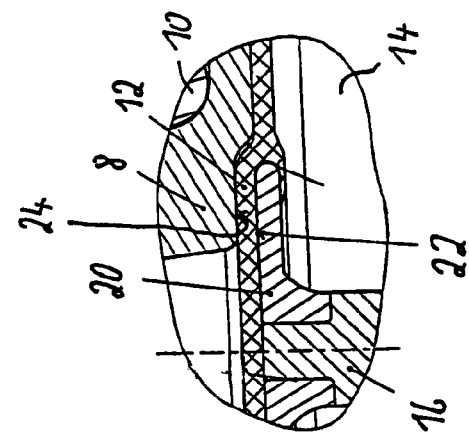
FIG. 2 is an enlarged view of area "A" of the embodiment of the inventive spring-actuated air-brake cylinder depicted in FIG. 1.
Figure 4:
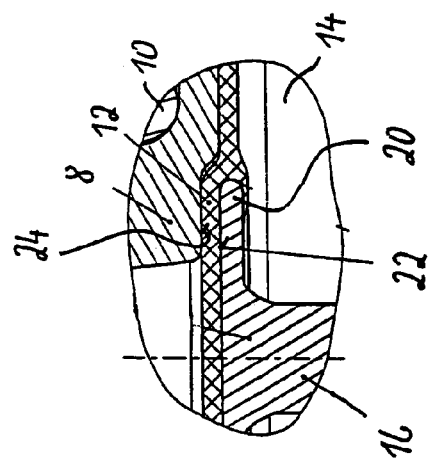
FIG. 4 is an enlarged view of area "B" of the embodiment of the inventive spring-actuated air-brake cylinder depicted in FIG. 3.
Figure 6:
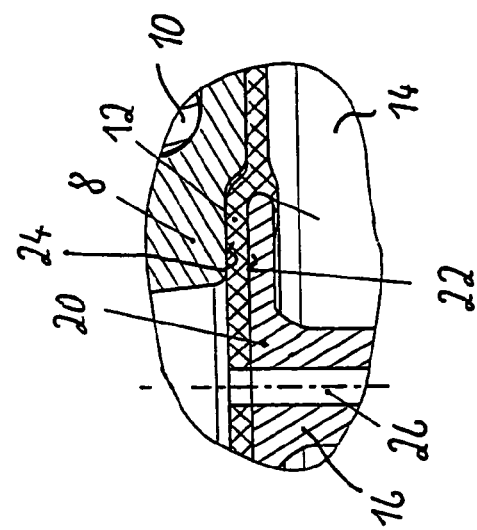
FIG. 6 is an enlarged view of area "C" of the embodiment of the inventive spring-actuated air-brake cylinder depicted in FIG. 5.

As depicted in the drawings (see e.g., FIGS. 2, 4 and 6), diaphragm 12 can be provided with a bulge 22 defining a well in which pressure member 20 is disposed. By this arrangement, the support and centering of the construction comprising push rod and pressure member are further improved.

Spring-actuated piston 8 can, as depicted in the drawings (see e.g., FIGS. 2, 4 and 6), be provided on its side facing the diaphragm with a recess 24 which receives bulge 22 of diaphragm 12. The centering of spring-actuated piston 8 is improved by this construction.

Figure 5:
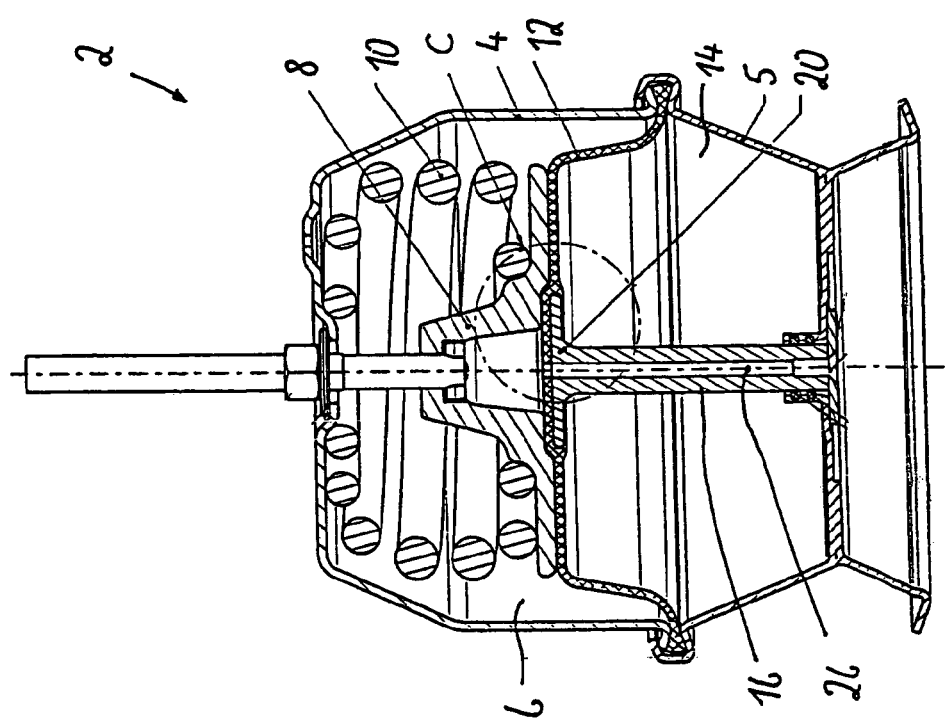
FIG. 5 is a cross-sectional view of a spring-actuated air-brake cylinder according to another alternative embodiment of the present invention.

In the embodiment of the spring-actuated air-brake cylinder according to the present invention depicted in FIG. 5, push rod 16 is provided with a central through duct 26, which is axially aligned with an aperture 27 of diaphragm 12.

Figure 8:
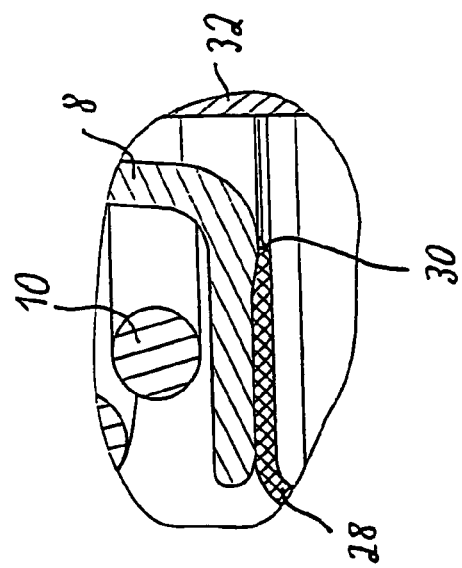
FIG. 8 is an enlarged view of area "D" of the embodiment of the inventive spring-actuated air-brake cylinder depicted in FIG. 7.
Figure 7:
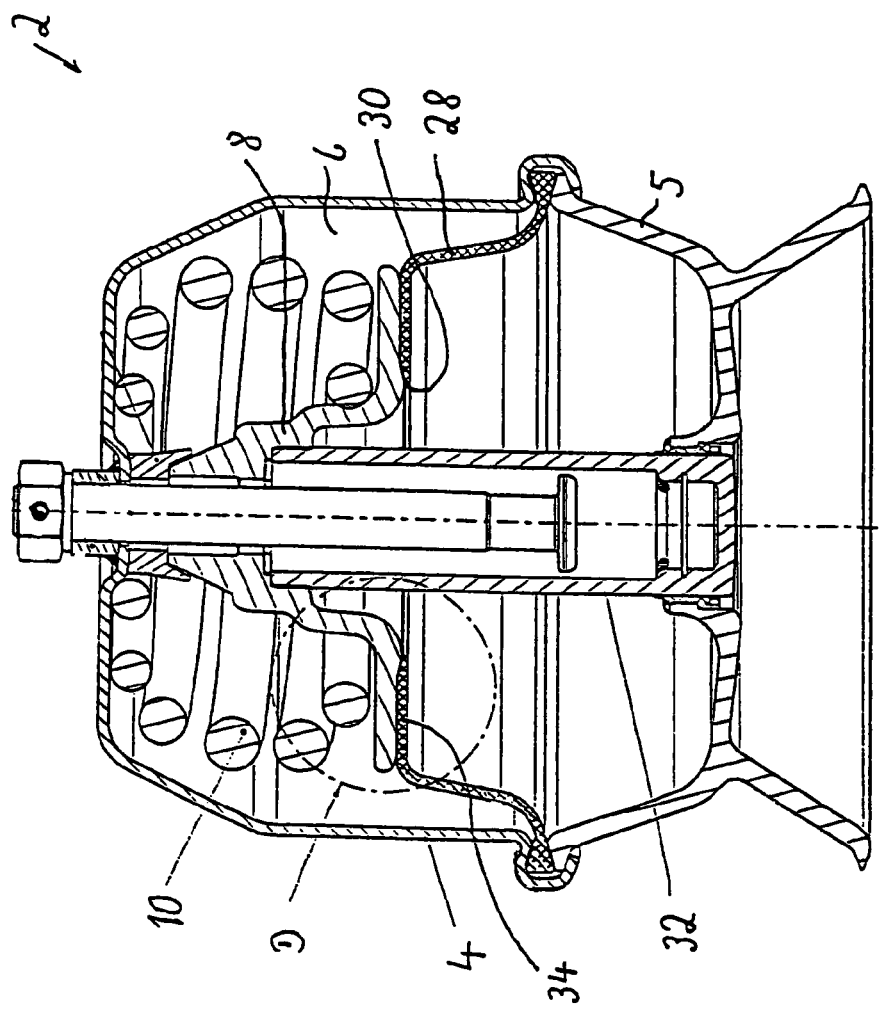
FIG. 7 is a cross-sectional view of a spring-actuated air-brake cylinder according to yet another alternative embodiment of the present invention.

In the embodiment of the spring-actuated air-brake cylinder according to the present invention depicted in FIG. 7 (see also FIG. 8), the diaphragm is formed as an annular diaphragm 28 with a central aperture 30, and the push rod is formed as a piston tube 32 which is connected to spring-actuated piston 8. Via an annular zone 34, annular diaphragm 28 is connected directly to spring-actuated piston 8 by vulcanization.

Figure 9:
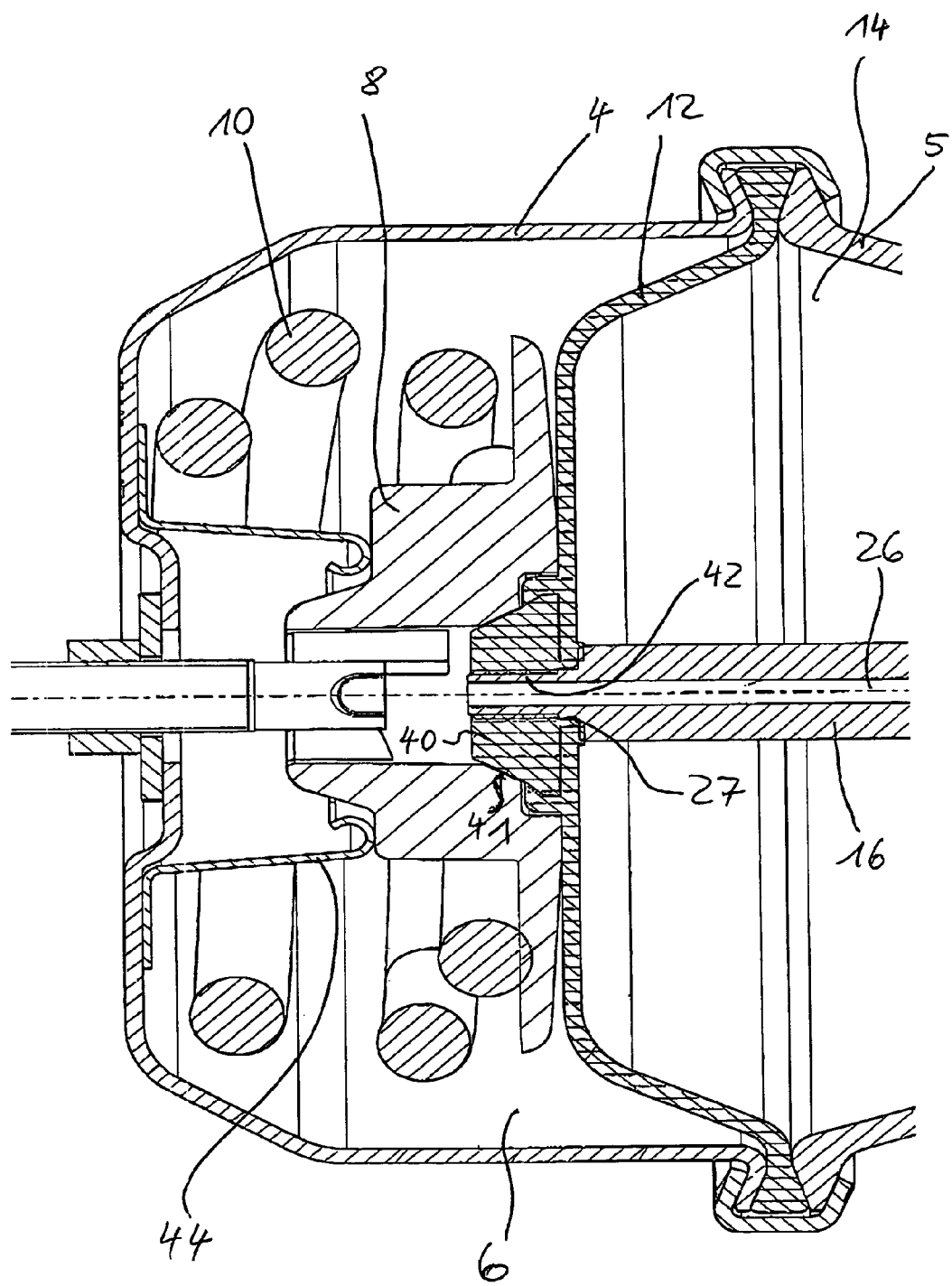
FIG. 9 is a cross-sectional view of a spring-actuated air-brake cylinder according to a further alternative embodiment of the present invention.

In the embodiment of the spring-actuated air-brake cylinder according to the present invention depicted in FIG. 9, push rod 16 is provided with a central through duct 26 similar to the embodiment of the present invention depicted in FIG. 5. A mounting member 40, preferably made of metal, located in the actuator spring chamber 6 is connected by means of vulcanization to diaphragm 12. A threaded extension 42 of push rod 16 extends through an aperture 27 of diaphragm 12 and is screwed into mounting member 40 in order to mount push rod 16.

Mounting member 40 desirably includes a conical alignment contour 41 for axially aligning piston 8 with push rod 16.

In addition, a stop unit 44 can be provided which limits the movement of piston 8 if pressure chamber 14 is fully pressurized.

By virtue of the connection of pressure member 20 of pressure rod 16 or of spring-actuated piston 8 to diaphragm 12 by a vulcanization process, there is no need for the conventional separate connecting elements such as threaded studs and perforated disks. The conventional use of restoring springs can also be avoided, since, according to embodiments of the present invention, push rod 16, pressure member 20 and diaphragm 12 of spring-actuated piston 8 form a one-piece unit with piston tube 32 and the diaphragm or annular diaphragm 28.

The elimination of the restoring spring has the advantage that greater force is delivered by the spring actuator, since the opposing force of a restoring spring is absent.

The secure connection, achieved by vulcanization, of push rod 16, of pressure member 20 and of spring-actuated piston 8 to diaphragm 12 can be used advantageously in all single-diaphragm and multi-diaphragm cylinders of spring-actuated air-brake cylinders and combinations comprising air service-brake cylinders and spring-actuated brake cylinders.

Accordingly, the present invention achieves a simple, cost-saving and secure connection between the diaphragm, on the one hand, and the pressure member or push rod or spring-actuated piston, on the other hand, so that there is no need for a restoring spring—reducing the time and effort of assembly, since the diaphragm forms, together with the pressure member and the push rod or together with the spring-actuated piston, a structural unit that can be prefabricated.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A spring-actuated air-brake cylinder for a vehicle brake system, comprising an actuator-spring chamber, a spring-actuated piston received in said actuator-spring chamber, a compression spring acting on said spring-actuated piston, a diaphragm disposed between said actuator-spring chamber and a pressure chamber, a sealed push rod positioned moveably in said pressure chamber, and a pressure member provided on said push rod, said diaphragm being connected to at least one of said push rod, said pressure member and said spring-actuated piston by means of vulcanization.

2. The spring-actuated air-brake cylinder according to claim 1, wherein said pressure member is at least one of disposed partly in said diaphragm and vulcanized partly into said diaphragm.

3. The spring-actuated air-brake cylinder according to claim 1, wherein said pressure member is a pressure plate, a periphery of said plate being embedded at least partly in said diaphragm.

4. The spring-actuated air-brake cylinder according to claim 1, wherein said diaphragm includes a bulge defining a well, and said pressure member is disposed in said well.

5. The spring-actuated air-brake cylinder according to claim 4, wherein said spring-actuated piston includes a recess on a side facing said diaphragm, said recess having a shape that is complementary to said bulge for receiving said bulge.

6. The spring-actuated air-brake cylinder according to claim 1, wherein said pressure member is at least one of formed as a part connectable to said push rod and integral with said push rod.

7. The spring-actuated air-brake cylinder according to claim 6, wherein said pressure member is connected to said push rod by means of at least one of threaded fastening, adhesive bonding, press fitting, shrink fitting and wobble riveting.

8. The spring-actuated air-brake cylinder according to claim 1, wherein said diaphragm includes an aperture defined therein, and at least one of said push rod and said push rod including said pressure member is provided with a central through duct axially aligned with said aperture.

9. The spring-actuated air-brake cylinder according to claim 1, further comprising a diaphragm cylinder disposed thereon.

10. A spring-actuated air-brake cylinder for a vehicle brake system, comprising an actuator-spring chamber, a spring-actuated piston received in said actuator-spring chamber, a compression spring acting on said spring-actuated piston, an annular diaphragm disposed between said actuator-spring chamber and a pressure chamber, said diaphragm including a central aperture defined therein, a sealed piston tube positioned moveably in said pressure chamber, said piston tube passing through said aperture and connected to said spring-actuated piston, said spring-actuated piston being connected directly to said diaphragm by means of vulcanization.

11. A spring-actuated air-brake cylinder for a vehicle brake system, comprising an actuator-spring chamber, a spring-actuated piston received in said actuator-spring chamber, a compression spring acting on said spring-actuated piston, a diaphragm disposed between said actuator-spring chamber and a pressure chamber, said diaphragm including an aperture defined therein, a sealed push rod positioned moveably in said pressure chamber, said push rod including a central through duct axially aligned with said aperture, said push rod further including a threaded portion extending through said aperture, and a mounting member disposed in said actuator-spring chamber and connected to said diaphragm by means of vulcanization, said mounting member constructed and arranged to receive said threaded portion of said push rod.

12. The spring-actuated air-brake cylinder according to claim 11, wherein said mounting member includes a conical alignment contour for axially aligning said piston with said push rod.

13. The spring-actuated air-brake cylinder according to claim 11, further comprising a stop unit for limiting movement of said piston when said pressure chamber is fully pressurized.

14. In a method for forming a spring-actuated air-brake cylinder for vehicle brake systems having a diaphragm in a spring chamber, the improvement comprising the vulcanization of said diaphragm to at least one of a push rod, a pressure member and a piston.

* * * * *